Sept. 20, 1938.  H. F. MAYNES  2,130,670
FISHING REEL
Filed Oct. 14, 1936  3 Sheets-Sheet 1
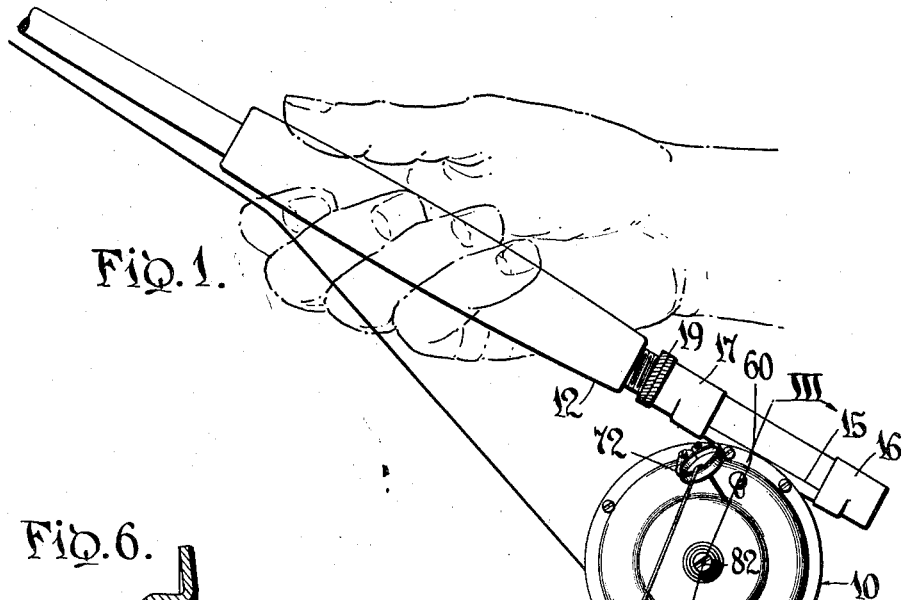
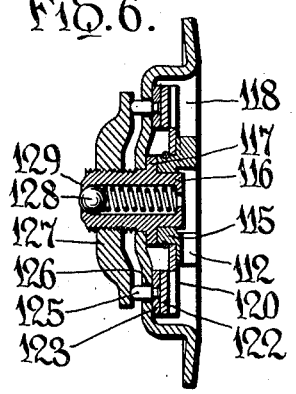
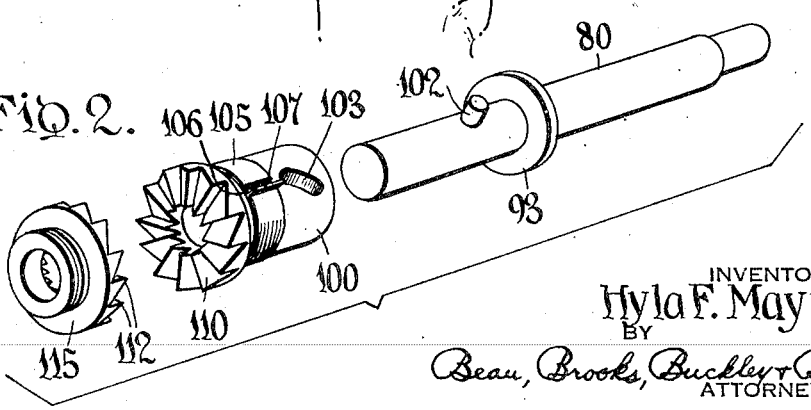
INVENTOR
Hyla F. Maynes,
BY
Beau, Brooks, Buckley & Beau.
ATTORNEYS

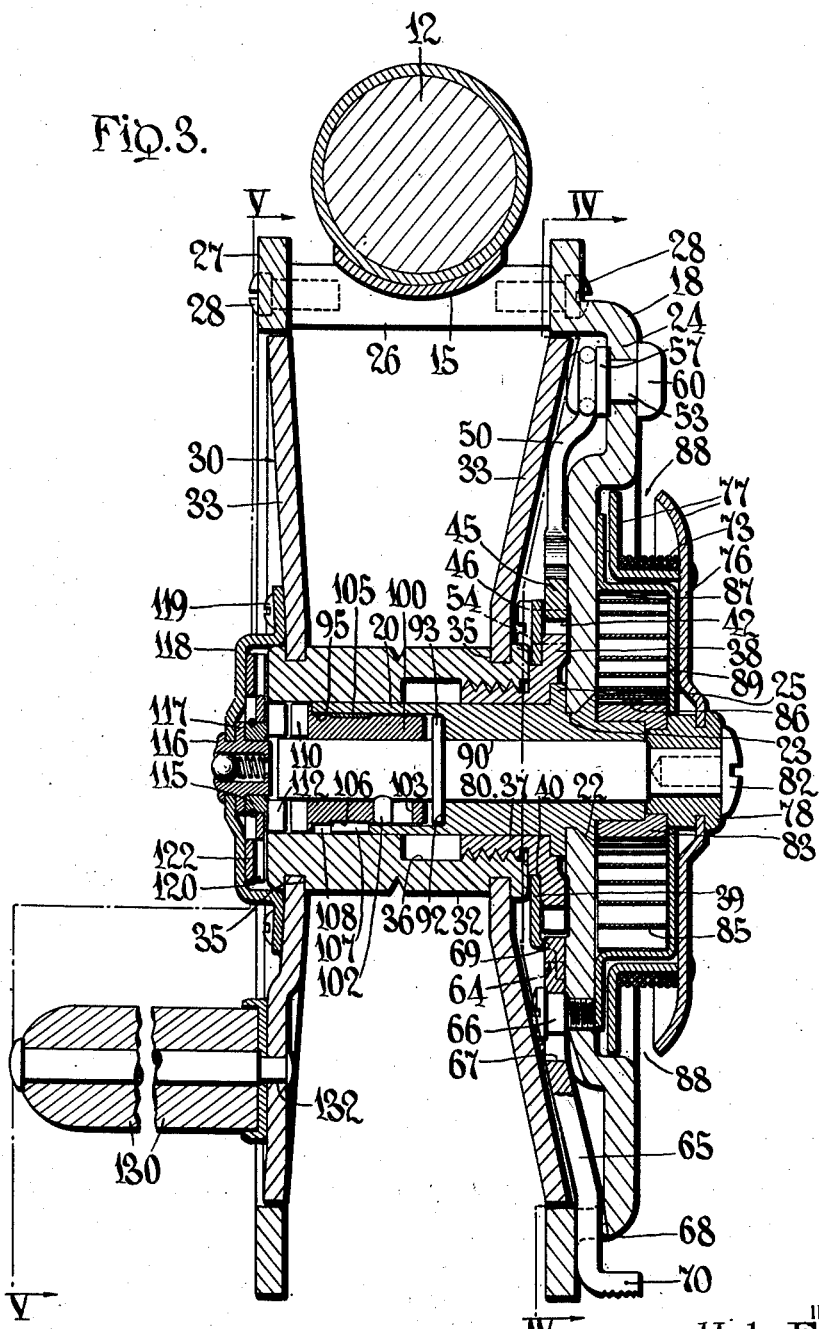

Sept. 20, 1938.                H. F. MAYNES                    2,130,670
                                FISHING REEL
                             Filed Oct. 14, 1936           3 Sheets-Sheet 3

INVENTOR
Hyla F. Maynes,
BY
Beau, Brooks, Buckley & Beau
ATTORNEYS

Patented Sept. 20, 1938

2,130,670

UNITED STATES PATENT OFFICE 2,130,670

FISHING REEL

Hyla F. Maynes, North Tonawanda, N. Y., assignor of one-half to Emma C. Maynes, North Tonawanda, N. Y.

Application October 14, 1936, Serial No. 105,555

15 Claims. (Cl. 242—84.3)

This invention relates to a fishing reel and it has particular relation to a so-called trout reel, or the like, although its use is not limited to any particular method of casting.

In utilizing the type of reel generally known as the trout reel, the rod grip is positioned on a rod in advance of the location of the reel, which is connected to the lower rod side adjacent the end of the rod. A portion of the fishing line is trained through the gripping fingers of the operator, and then a suitable length of line is drawn manually from the reel preparatory to casting. This loose line is permitted to fall to the ground.

After the fly, or the like, has been cast, the line is reeled in, either manually by operating a crank handle at one side of the reel, or in a certain type of automatic reel, by means of a spiral spring which is released to unwind and rotate the reel spool at the moment desired. When the spring unwinds rapidly the fly is drawn in, and care must be exercised to prevent the fly from being damaged by striking the loops or line guides at the end of the rod.

If the reel is provided with a crank handle in this type of arrangement, in the various operations, the operator generally finds it necessary to change hands at the rod grip in order to avoid awkwardness in manipulation.

One object of the present invention is to provide a fishing reel which has advantages superior to those of the known types of automatic trout reel and in which the disadvantages of these trout reels are obviated.

Another object of the invention is to provide an improved fishing reel including spool rotating mechanism for translating substantially linear actuating forces into spool rotating forces.

Another object of the invention is to provide an improved reel mechanism for transmitting driving forces from a driving element to a line winding spool of a fishing reel.

Another object of the invention is to provide an improved clutching mechanism for fishing reels.

Another object of the invention is to provide a fishing reel having improved braking or clicking mechanism.

Another object of the invention is to provide an improved slip clutch mechanism for fishing reels.

In the drawings:

Fig. 1 is a side elevation of a fishing reel illustrating the manner in which it is installed for operation upon a rod;

Fig. 2 is an exploded perspective of a clutch mechanism and shaft included in the reel;

Fig. 3 is a vertical section, on a larger scale, taken substantially along the line III—III of Fig. 1;

Fig. 6 is a vertical section of an alternate form of cap and slip clutch for the reel.

Figure 4:
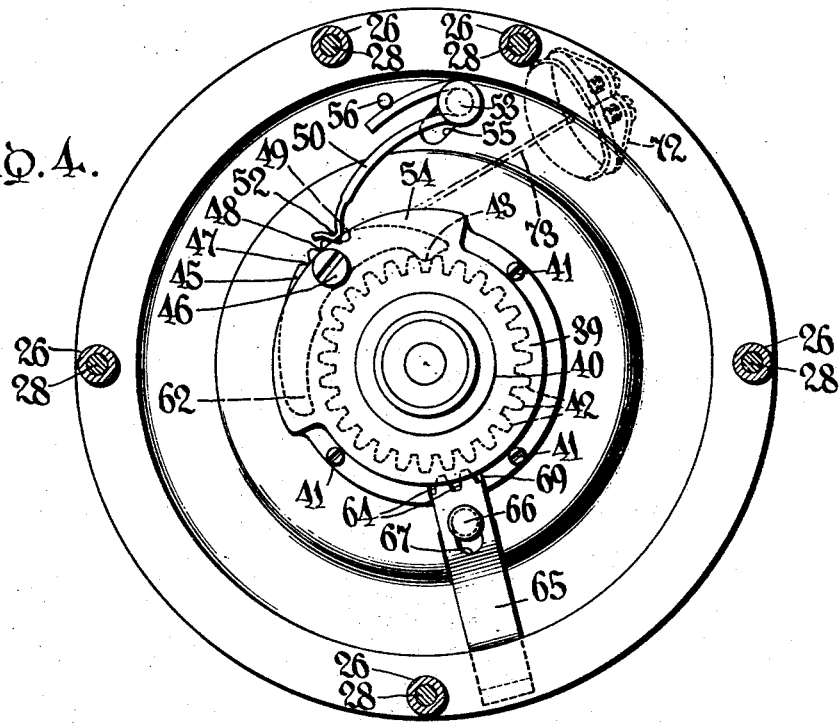
Fig. 4 is a vertical section taken substantially along the line IV—IV of Fig. 3, and with portions of the structure shown in elevation.
Figure 5:
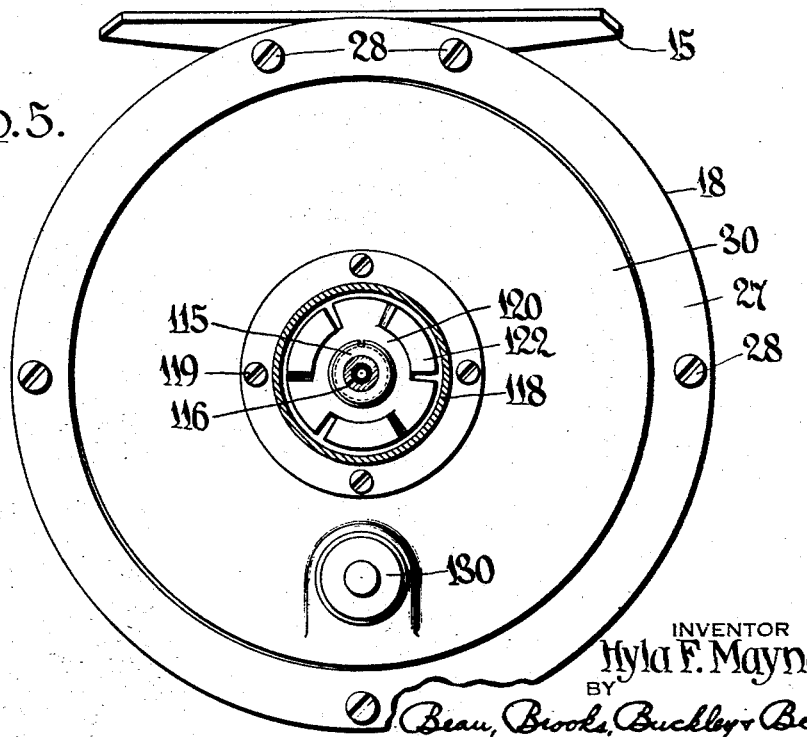
Fig. 5 is a vertical section taken substantially along the line V—V of Fig. 3 with portions of the reel shown in elevation.

Referring to Figs. 1 to 3, a fishing reel 10 particularly designed for fly casting, or the like, is secured to a casting rod 12 by means of a saddle 15 having its ends connected in ferrules or sleeves 16 and 17, the latter of which is axially adjustable upon the rod by means of a nut 19 screw threaded upon the latter to permit proper assembly and disassembly of the reel and the rod. The saddle 15 is rigidly secured to a supporting casing or frame 18 of the reel.

One side of the casing 18 is provided with a bearing sleeve 20 rigidly secured, as indicated at 22, in an opening 23 formed in a plate-like casing wall 24, and is provided with a shoulder or annular flange 25 which abuts the inner side of the casing wall adjacent the opening 23. The outer portion of the frame or casing 18 is provided with spacing posts 26 rigidly supporting an annular frame member or ring 27 that is co-axial with the sleeve 20 and circumferentially spaced from the sleeve end opposite that which is connected to the casing wall. The posts 26 constitute the sole support of the ring 27 upon the frame 18. Suitable fastening elements 28, such as screws or bolts, secure the posts rigidly to the outer marginal portion of the casing wall 24 and to the ring 27. The frame 18, which includes the wall 24, sleeve 20, posts 26 and ring 27, constitutes a unitary supporting structure for the operating parts of the reel.

The sleeve 20 rotatably carries a reel spool 30 that has a hub 32 surrounding the sleeve and has opposed flanges 33 rigidly mounted, as indicated at 35, adjacent opposite ends of the hub. It will be noted that the frame or casing 18 is open on one side for freely receiving the spool axially upon the sleeve 20 through the ring 27. One end portion of the hub 32 is provided with a substantially cylindrical recess 36 having a greater diameter than the bearing diameter of the hub and is internally screwthreaded to receive an externally screwthreaded bearing collar 37 that has a radial flange 38 formed thereon for abutting the shoulder 25 adjacent the wall of the casing 18. A substantially annular cover plate 39 has its inner edge disposed in a shouldered portion 40 of the collar flange 38 in such manner as not to interfere with rotation of the collar 37, and is disposed in opposed relation to the end of the spool hub 32. Suitable fastening elements 41, such as screws or pins, secure the plate 39 rigidly to the casing wall.

The outer circumferential edge of the flange 38 is provided with gear-like teeth 42 which are slidably engageable with a rounded end portion 43 of an arcuate lever 45 to provide a brake and clicker mechanism. An intermediate portion of the lever 45 has a pivotal connection 46 securing it to the wall of the casing 18 and three V-shaped recesses 47, 48 and 49 are formed along the outer side of the lever. Two of these recesses (47 and 49) are provided on opposite sides of the connection 46 and the third recess 48 is in substantial alignment with the connection.

A resilient arm 50 has a substantially V-shaped detent 52 at one end portion thereof and has its other end fixed upon a pin 53 that is slidably mounted in a slot 55 formed in the wall of the reel casing. A portion of the plate 39 is cut away, as indicated at 54, in order to expose the teeth 42 for engagement with the opposite end portions of the lever 45. The arm 50 can be formed of a suitable type of resilient material bent into loop, or other suitable form, and having an intermediate portion bearing against a lug or pin 56 provided rigidly in the wall of the casing 18. As best shown in Fig. 3, a spacer 57 is provided on the pin 53 between the casing wall and the end portion of the resilient arm 50 in order to position the latter properly for engagement with the lever 45. A head 60 on the outer end of the pin 53 and slidably bearing against the outer side of the casing wall, is manually operable to move the arm to various positions for selectively engaging any of the recesses 47, 48 or 49.

When the detent 52 engages the recess 49, the end 43 of the lever engages the teeth 42 under the influence of the pressure exerted by virtue of the resiliency of the arm 50 and a clicking and braking action is provided when the spool 30 is rotated. By sliding the pin 53 to engage the detent 52 in the intermediate recess 48 opposite ends of the lever 45 are held free from engagement with the teeth 42. Likewise, when the detent 52 engages the recess 47 an end portion 62 of the lever bears against the teeth 42 without clicking action and provides a smooth braking action or drag upon the spool during its rotation.

A latch 65 is provided with inner end teeth 64 for engaging the teeth 42, and is slidable upon a pin 66 secured rigidly in the wall of the casing 18. The pin 66 extends through a slot 67 formed longitudinally in the latch 65 for guiding the latter and limiting its movement longitudinally through an opening 68 formed in the wall of the casing 18. The latch also extends through an opening 69 in the plate 39. A suitable manually operable handle 70 formed on the outer end of the latch can be actuated to move the teeth 64 into locking engagement with the teeth 42 of the flanged collar 37 and thus lock the spool 30 against rotation. When the latch 65 is in latched or locked relation to the stationary teeth 42, the spool 30, by reason of the screw threaded connection of the spool hub 32 upon the collar 37, can be unscrewed from the latter and disassembled laterally from the frame 18, that is, axially of the supporting bearing sleeve 20. This arrangement provides a very convenient method of assembly and disassembly of the spool 30 which, after being unscrewed, is free to be moved axially from the bearing sleeve 20 without displacing or disturbing any part of the frame 18, such as the wall 24, posts 26 and ring 27 from which such spool is always spaced to insure unobstructed spool rotation during the operation of the reel.

At the outer side of the casing and at a location readily accessible, a ring 72, or like element, through which a cord or line 73 can be threaded, is mounted upon the outer surface of the casing wall 18. An enlargement, such as an inherently stiff or rigid loop or ring 75, which will not slip through the ring 72 is connected to the outer end of the cord 73 for manual actuation of the latter in a direction laterally from the casing wall surface, and the inner end of the cord 73 is connected to a rotatable pulley or drum 76 between flanges 77 formed thereon. This drum has an integral or rigid central collar or hub 78 that is rigidly connected to an outer end portion of a shaft 80 for rotation therewith on the outer side of the casing, and is held against axial displacement therefrom by means of a screw 82 threaded axially into the shaft end. A collar 83 is rigidly connected to the hub 78 and rotatably surrounds an end portion of the bearing sleeve 20 of the reel casing. It is to be understood that the collar 83 and the hub 78 can be made as an integral unit and rigidly carried as a part of the drum 76.

An inner end or convolution of a spiral spring 85 has a positive connection 86 for securing it to the collar 83 and the outer end of the spiral spring has a positive connection 87 for securing it to the inner wall of a stationary drum 89 in which the spring 85 is encased adjacent the outer side of the wall of the casing 18. The relatively rotatable drums 76 and 89 are telescoped for the purpose of conserving space, and the inner drum 89 is welded or otherwise rigidly secured to the outer side wall of the casing 18. There is an unobstructed circumferential opening or space 88 between the flanges 77 to provide access to the drum surface upon which the cord 73 can be wound without disassembling any part of the reel structure. The cord is simply connected and manually wound upon the drum and if such cord becomes worn, or for other reasons is to be replaced by another, the operations necessary can be accomplished with minimum inconvenience.

The shaft 80 is rotatably carried in a bearing opening 90 formed in the bearing sleeve of the reel casing 18 and the intermediate portion of the sleeve at the inner extremity of the bearing opening is formed with a shoulder 92 which abuts a flange or shoulder 93 formed rigidly on an intermediate portion of the shaft. The outer portion of the bearing sleeve is recessed to form a cylindrical chamber 95 which is larger in diameter than the bearing opening 90 and receives therein a clutch sleeve 100 that is slidable axially upon the shaft 80 and is also rotatable to a limited degree thereon.

A pin 102 projecting radially and rigidly from the shaft 80 is slidable in a slot 103 that is diagonally formed through the wall of the clutch sleeve 100. Therefore, rotation of the shaft 80 in one direction causes a camming action of the pin 102 in the slot tending to slide the clutch sleeve to the right (Fig. 3), and rotation of the shaft in the opposite direction provides camming action of the pin in the slot, tending to slide the clutch sleeve to the left.

A resilient split ring 105 is disposed in an annular recess 106 formed in the outer periphery of the clutch sleeve, and a radial flange or finger 107 formed on one end of the split ring is slidable axially in a slot 108 formed in the surrounding wall of the bearing sleeve 20. This ring resiliently engages the inner periphery of the wall of the sleeve in the chamber 95 and by virtue of its confinement between the walls of the groove 106 and sleeve 20, such ring provides a one way brake operable as a slip clutch for the clutch sleeve. As the shaft 80 is rotated in one direction, the ring 105 contracts slightly to apply a slight drag upon the clutch sleeve, and as the shaft is rotated in the opposite direction the ring 105 expands to permit freer rotation of the sleeve. This arrangement is for the purpose of facilitating the camming action of the pin 102 in the slot 103.

The outer end of the clutch sleeve 100 is formed with one way clutch elements 110 which are engageable with companion clutch elements 112 formed upon the end of a clutch sleeve 115. A hollow plug or cylindrical support 116 rotatably supports the clutch sleeve 115 and an intermediate flange or shoulder 117 provides an abutment to prevent outward axial movement of the clutch sleeve thereon, as well as to assist in positioning a cap or cupped plate 118 that is rigidly mounted upon this support 116. Suitable fastening elements 119 rigidly secure the cap 118 upon the outer side of the spool 30 coaxially thereof. A split disk 120 having resilient wing sections 122 bent outwardly from the medial plane thereof is rigidly mounted axially upon the clutch sleeve 115 and normally the wing sections frictionally contact the inner face of the cap 118 (Fig. 3) to provide a slip clutch structure. In the alternative form of slip clutch structure (Fig. 6), the wing sections 122 frictionally contact the inner face of an annular disk 123 in braking relation. Suitable dowels 125 extend slidably through openings 126 formed through the wall of the cap 118 and are rigidly secured to the disk 123 which is thus prevented from rotation with respect to the cap 118 but is movable axially of the support 116.

An adjusting cap 127 is screwthreaded upon the outer end of the support 118 and its outer marginal portions contact the outer ends of the dowels in such manner that loosening or tightening of the cap 127 varies the frictional pressure of the brake disk 123 against the wings 122. The split disk 120 extends radially outwardly a sufficient distance to be opposite the outer end portion of the spool hub 32 and the latter prevents axial displacement of the split disk and clutch sleeve 115 in an inward direction.

The cylindrical support 116 is provided with a spring pressed ball valve 128 which is held against outward displacement by an inwardly turned flange 129. Thus the ball valve can be pressed inwardly with a conventional oiling container for the purpose of lubricating the inner operating elements of the reel.

It is to be understood that rotation of the spool can be manually accomplished by manipulating a crank handle 130 mounted upon one of the flanges 33, as indicated at 132. During such manual rotation the clutch elements 110 and 112 are disengaged, or such rotation will automatically disengage them. Also when it is desired to disassemble the spool 30 in the manner specified above, the handle 130 can be employed to facilitate rotation of the spool in unscrewing it from the collar 37, while the latch 65 is in locked relation to the teeth 42. Thus, the handle 130 performs two definite functions.

In operating the reel, desired braking action or drag, if desired, can be provided by manipulating the head 60 for adjusting the arm into engagement with the desired notch in the lever 45. In certain types of casting operations considerable length of fishing line is manually drawn from the spool and then the fly is cast, or the fly or plug can be cast and the spool can be permitted to play out the line. In reeling in the line, the operator takes hold of the ring or loop 75 and pulls the cord 73 substantially linearly outwardly, as indicated in Fig. 1. This action winds up the spiral spring 85. Since the cord 73 is connected to the drum 76, which is in turn rigidly connected to the shaft 80, this linear actuation of the cord will be translated into rotative motion to rotate the shaft 80, and at the same time, the pin 102 will operate in the slot 103 to slide the clutch members 110 into engagement with the clutch members 112. Then a driving connection is established between the shaft and the spool 30. This driving connection is established almost instantaneously with the beginning of the outward movement of the cord 73 and the latter can be drawn out any distance commensurate with its length, or the length of the operator's arm, or the stroke he desires to establish. The stroke can be short or long.

After the cord 73 has been drawn outwardly a desired distance, the operator then moves his hand back toward the ring 72, and the spiral spring, which has been wound up during the outward stroke, unwinds and winds the cord back upon the drum 76. This action concurrently causes rotation of the shaft 80 in a direction of rotation opposite that in which the shaft was rotated in pulling out the cord. This rotation automatically disengages the one way clutch elements 110 and 112. The torsional force of the spring responds very rapidly when the operator permits the cord 73 to be wound on the drum and the cord can be actuated inwardly and outwardly to and from the drum as rapidly as the operator desires. During this movement the spool is intermittently rotated in the same direction, i. e., in a reeling-in direction, while very slight, if any, reeling-out action is permitted. In fact, the instant tendency toward reeling out the line occurs the cord 73 can be drawn outwardly again.

It is to be understood that the braking action upon the spool provided by the split ring 120 can be varied according to the desires of various individuals. However, it is generally advisable to provide a braking action that will insure slipping action before the tensile strength of the cord 73 is overcome. That is, the brake elements provide a safety factor to prevent failing of the cord 73 or other elements of the reeling in arrangement.

Although only one form of the invention has been shown and described in detail, it will be apparent to those skilled in the art that the invention is not so limited, but that various changes can be made therein without departing from the spirit of the invention or from the scope of the appended claims.

I claim:

1. A fishing reel comprising a frame, a line winding spool rotatably carried in the frame and at least partially enclosed by the latter, a rotatable member journaled in the frame, one way clutch elements connected to said spool and to said member, means included with said member for positively actuating the clutch elements into clutching engagement in response to rotation of said member in one direction, a pulley connected rigidly to said rotatable member for rotation therewith adjacent the outer side of said frame and having an annular cord-receiving recess circumferentially open adjacent the outer side of the frame, said pulley having an inwardly opening cupped portion, a spiral spring substantially enclosed in said cupped portion and resisting rotation of the rotatable member, means for connecting the spring to the frame and to said member, and a cord normally wound upon the pulley and operable when drawn outwardly to rotate said member in said one direction in opposition to said spring.

2. A fishing reel comprising a frame, a line winding spool rotatably carried in the frame, a shaft rotatable in the frame substantially coaxially with respect to the spool, a first clutch element slidably mounted upon said shaft, said shaft and clutch element having engageable camming surfaces responsive to relative rotation of the shaft and clutch element to move the latter axially of the shaft, a second clutch element supported by the spool adjacent the first clutch element and engageable therewith in response to relative rotation of the first clutch element and shaft in one direction, a slip clutch included in the connection between the second clutch element and the spool, yieldable means connected to said shaft and normally resisting rotation of the latter, and means for rotating said shaft in opposition to force exerted by said yieldable means.

3. A fishing reel comprising a frame, a line winding spool rotatably carried in the frame, an annular row of teeth carried by the spool coaxially therewith, a clicker member carried by the frame and having a portion yieldably engageable with the teeth in clicking relation, said clicker member having another portion movable into braking and non-clicking contact with the teeth, and means for actuating the clicker member into clicking and non-clicking engagement with the teeth.

4. A fishing reel comprising a frame, a line winding spool rotatably carried in the frame, an annular row of teeth carried by the spool coaxially therewith, a clicker member carried by the frame and having a portion yieldably engageable with the teeth in clicking relation, said clicker member having another portion movable into braking and non-clicking contact with the teeth, means for actuating the clicker member into clicking and non-clicking engagement with the teeth, and a latch carried by the frame and movable into locking engagement with the teeth.

5. A fishing reel comprising a frame, a line winding spool rotatably carried in the frame, an annular row of teeth carried by the spool coaxially therewith, a clicker lever pivoted intermediate its ends upon the frame, one end portion of the lever having a clicker projection engageable in clicking relation with said teeth, the other end portion of the lever having a braking surface engageable in non-clicking relation with the teeth, a resilient member adjustably mounted upon the frame and selectively engageable with the lever to hold the latter in neutral position or to press either end of the lever against said teeth.

6. A fishing reel comprising a frame, a line winding spool rotatably carried in the frame, a rotatable member journaled in the frame, one way clutch elements connected to said spool and to said member, means included with said member for positively actuating the clutch elements into clutching engagement in response to rotation of said member in one direction, a pulley having an inwardly opening cupped portion and connected rigidly to said rotatable member for rotation therewith adjacent the outer side of said frame and having an annular cord receiving recess circumferentially open adjacent the outer side of the frame, a spiral spring substantially enclosed by said pulley and resisting rotation of the rotatable member, means for connecting the spring to the frame and to said member, the latter means including a casing substantially telescoped inside said pulley and rigidly mounted upon the frame, and a cord normally wound upon the pulley and operable when drawn outwardly to rotate said member in said one direction in opposition to said spring.

7. A fishing reel comprising a frame open on one side for receiving a spool and having a bearing support projecting toward the open side, a line winding spool disposed substantially in the open side of the frame and being rotatably carried on said bearing support, means connected to said spool for rotating it, a member rotatable on said bearing support and releasably connected to said spool for normally maintaining said spool and member against relative rotation, and means connected to said member for locking it relative to the frame incidentally to releasing the spool from said member, whereby said spool can be released and slid axially from the bearing support.

8. A fishing reel comprising a frame open on one side for receiving a spool and having a bearing support projecting toward the open side, a line winding spool disposed substantially in the open side of the frame and being rotatably carried on said bearing support, means connected to the spool for rotating it, a collar rotatably supported on said bearing support and releasably screwthreaded upon said spool coaxially thereof, and a latch mounted on said frame and movable into locking engagement with said collar whereby the spool can be unscrewed and removed from the open side of the frame without displacing any part of the latter.

9. A fishing reel comprising a frame open on one side for receiving a spool and having a bearing support projecting toward the open side, a line winding spool disposed substantially in the open side of the frame and being rotatably carried on said bearing support, a crank handle on the spool and projecting from the open side of the frame for manually rotating the spool, means for mounting and demounting the spool on the bearing support independently of movement of any part of said frame, a rotatable member journaled in the frame substantially coaxially with reference to the axis of rotation of the spool and extending through said frame, one way clutch elements connected to said spool and to said member, means included with said member for positively actuating the clutch elements into clutching engagement in response to rotation of said member in one direction, a spring connected to said member and to said frame at the side thereof opposite the spool for resisting rotation of said member in one direction, and a flexible element connected to said member for concurrently imparting rotation thereto in said one direction and energizing the spring in opposition to such latter rotation.

10. A fishing reel comprising a supporting structure, a line winding spool rotatably carried in said structure, a rotatable member journaled in said structure, a pair of one way clutch elements, a device connecting one clutch element to said spool, means connected to said member and connected to the other clutch element for positively engaging the clutch elements in response to rotation of said member in one direction, a slip clutch included in said device, a manually operable device connected to the slip clutch for arying the clutching resistance of the latter, yieldable means connected to said member and normally resisting rotation of the latter, and means for rotating said member against the force exerted by said yieldable means.

11. A fishing reel comprising a supporting structure, a line winding spool carried in said structure, a pulley having a bearing member rotatably carrying the pulley in said structure, a pair of one way clutch elements, means connecting one clutch element to the spool, means connecting said pulley to the other clutch element for positively engaging said clutch elements in response to rotation of said member in one direction, said structure having a recessed wall portion partially inclosing a peripheral and side portion of said pulley therein in circumferentially adjacent relation, whereby the outer wall portion of the structure overhangs a portion of the periphery of the pulley, a resilient member connected to said structure and to said pulley for resisting rotation of the latter, and a flexible member wound on said pulley and manually operable to rotate the latter against the resistance of the resilient member.

12. A fishing reel comprising a supporting structure, a line winding spool rotatably carried in said structure, a rotatable member journaled in said structure, a pulley rigidly mounted on said rotatable member, one way clutch elements connected to said spool and to said member, means included with said member and elements for actuating the latter into clutching engagement in response to rotation of said member in one direction and disengaging the clutch elements in response to rotation of said member in the opposite direction, said structure having a recessed wall portion partially inclosing a peripheral and side portion of said pulley therein in circumferentially adjacent relation, the outer side of the recessed wall portion being in a plane intersecting an intermediate portion of the periphery of the pulley, a flexible member wound upon the pulley to actuate the rotatable member, and resilient means connected to the rotatable member and to the structure for yieldably resisting the rotation of the rotatable member.

13. A fishing reel comprising a supporting structure, a line winding spool rotatably carried in said structure, a rotatable member journaled in said structure, a pulley having a pair of spaced flanges, the spacing of which decreases toward their peripheries, one way clutch elements connected to said spool and to said member, means included with said member and elements for actuating the latter into clutching engagement in response to rotation of said member in one direction and disengaging the clutch elements in response to rotation of said member in the opposite direction, said structure having a recessed wall portion partially inclosing a peripheral and side portion of said pulley therein in circumferentially adjacent relation, the edge of the wall containing the recessed portion being disposed in a plane intersecting intermediately the circumferential space between the flanges of the pulley, a flexible member wound upon the pulley to actuate the rotatable member, and resilient means connected to the rotatable member and to said structure for yieldably resisting rotation of the rotatable member.

14. A fishing reel comprising a supporting structure, a line winding spool rotatably carried in said structure, a rotatable member journaled in said structure and rotatable in opposite directions, one way clutch elements connected to said spool and to said member, means connected to said member and engageable with one clutch element for positively engaging the clutch elements in response to rotation of said member in one direction, a one-way friction device connected to one of the clutch elements and to said structure normally applying frictional braking action on the latter clutch element in response to rotation of said member in one direction for facilitating coaction of said clutch elements and relieving the frictional braking action in response to rotation of said member in the opposite direction, yieldable means connected to said member and normally resisting rotation of the latter, and means for rotating said member against the force exerted by said yieldable means.

15. A fishing reel comprising a supporting structure, a line winding spool rotatably carried in said supporting structure, a shaft rotatable in said supporting structure substantially coaxially with respect to the spool, a first clutch element slidably mounted upon said shaft, said shaft and clutch element having engageable camming surfaces responsive to relative rotation of the shaft and clutch element to move the latter axially of the shaft, a second clutch element having a connection with said spool in a position adjacent the first clutch element and engageable with the latter in response to relative rotation of the first clutch element and shaft in one direction, a one way slip clutch connected to a portion of said supporting structure and engaging said first clutch element, said one way slip clutch normally applying frictional braking action on the latter clutch element in response to rotation of said shaft in one direction for facilitating coaction of said clutch elements, a second slip clutch included in said connection between the second clutch element and the spool, yieldable means connected to said shaft and normally resisting rotation of the latter, and means for rotating the shaft against the force exerted by said yieldable means.

HYLA F. MAYNES.